United States Patent
Kubba et al.

(10) Patent No.: US 10,321,217 B2
(45) Date of Patent: **\*Jun. 11, 2019**

(54) VIBRATION TRANSDUCER CONNECTOR PROVIDING INDICATION OF WORN STATE OF DEVICE

(71) Applicant: Google LLC, Mountain View, CA (US)

(72) Inventors: Michael Kubba, Mountain View, CA (US); Jeremy Evan Blum, San Francisco, CA (US); Livius Chebeleu, San Jose, CA (US); Chi Kin Benjamin Leung, San Jose, CA (US); Jordan Kestler, Pacifica, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/721,594

(22) Filed: Sep. 29, 2017

(65) Prior Publication Data

US 2018/0063627 A1 Mar. 1, 2018

Related U.S. Application Data

(63) Continuation of application No. 15/254,503, filed on Sep. 1, 2016, now Pat. No. 9,807,490.

(51) Int. Cl.
| | |
|---|---|
| *H04R 1/00* | (2006.01) |
| *H04R 1/10* | (2006.01) |
| *H04R 1/46* | (2006.01) |
| *G02C 11/00* | (2006.01) |
| *H04R 1/02* | (2006.01) |

(52) U.S. Cl.
CPC ............. *H04R 1/1041* (2013.01); *H04R 1/46* (2013.01); *G02C 11/10* (2013.01); *H04R 1/028* (2013.01); *H04R 2225/61* (2013.01); *H04R 2400/03* (2013.01); *H04R 2460/13* (2013.01)

(58) Field of Classification Search
CPC ...... H04R 1/10; H04R 1/1008; H04R 1/1016; H04R 1/1041; H04R 2225/61; H04R 25/65
See application file for complete search history.

(56) References Cited

U.S. PATENT DOCUMENTS

| | | | | |
|---|---|---|---|---|
| 4,941,180 A | * | 7/1990 | Buettner | H04R 25/602 381/323 |
| 5,278,912 A | | 1/1994 | Waldhauer | |
| 5,341,433 A | * | 8/1994 | Meyer | H04R 25/502 381/324 |
| 5,697,099 A | * | 12/1997 | Siska, Jr. | A42B 3/046 2/422 |
| 6,275,596 B1 | | 8/2001 | Fretz et al. | |

(Continued)

FOREIGN PATENT DOCUMENTS

WO 2008/123667 10/2008
WO 2015/142893 9/2015

*Primary Examiner* — Matthew A Eason
(74) *Attorney, Agent, or Firm* — McDonnell Boehnen Hulbert & Berghoff LLP

(57) ABSTRACT

Arrangements for bone conduction transducers (BCTs) that couple to wearable devices are described herein. An example BCT couples to a wearable device via a moveable member, and is arranged on the wearable such that the BCT member moves so as to provide an indication as to whether or not the wearable device is being worn.

20 Claims, 9 Drawing Sheets

(56) References Cited

U.S. PATENT DOCUMENTS

| | | | |
|---|---|---|---|
| 8,553,910 B1* | 10/2013 | Dong | G02B 27/02 351/158 |
| 8,824,712 B2* | 9/2014 | Sacha | H04R 25/50 381/321 |
| 9,020,168 B2* | 4/2015 | Karkkainen | H04R 1/1075 381/151 |
| 9,129,500 B2* | 9/2015 | Tenenbaum | G08B 21/02 |
| 9,288,591 B1* | 3/2016 | Dong | H04R 11/00 |
| 9,807,490 B1* | 10/2017 | Kubba | H04R 1/46 |
| 2002/0039427 A1 | 4/2002 | Whitwell et al. | |
| 2006/0045304 A1* | 3/2006 | Lee | H04R 1/1041 381/384 |
| 2007/0041595 A1 | 2/2007 | Carazo et al. | |
| 2007/0076897 A1* | 4/2007 | Philipp | H04R 1/1041 381/74 |
| 2007/0121959 A1* | 5/2007 | Philipp | H04R 1/1041 381/74 |
| 2008/0273163 A1* | 11/2008 | Sasaki | G02C 11/06 351/113 |
| 2008/0292126 A1* | 11/2008 | Sacha | H04R 25/02 381/330 |
| 2009/0249478 A1* | 10/2009 | Rosener | G06F 21/31 726/19 |
| 2011/0158443 A1* | 6/2011 | Åsnes | H04R 25/606 381/326 |
| 2011/0182458 A1* | 7/2011 | Rosener | H04R 1/1041 381/384 |
| 2012/0244812 A1* | 9/2012 | Rosener | H04M 1/05 455/41.3 |
| 2013/0051585 A1 | 2/2013 | Karkkainen et al. | |
| 2013/0156202 A1 | 6/2013 | Hamacher | |
| 2013/0300949 A1* | 11/2013 | Yamamoto | H04N 5/70 348/800 |
| 2014/0363003 A1* | 12/2014 | Kupershmidt | H04R 29/00 381/58 |
| 2014/0363033 A1 | 12/2014 | Heiman et al. | |
| 2015/0036856 A1 | 2/2015 | Pruthi et al. | |
| 2015/0374971 A1* | 12/2015 | Dar | A61B 5/0478 607/139 |

\* cited by examiner

VIBRATION TRANSDUCER CONNECTOR PROVIDING INDICATION OF WORN STATE OF DEVICE

CROSS-REFERENCE TO RELATED APPLICATIONS

This application is a continuation of U.S. application Ser. No. 15/254,503, filed Sep. 1, 2016, which is hereby incorporated by reference in its entirety and for all purposes.

BACKGROUND

Wearable computing devices, such as head-wearable devices, ear-piece devices, smart watches, glasses-style and other head-mountable devices, body-worn health monitors, and smart headphones or headsets, are becoming increasingly common.

This application is a continuation of U.S. application Ser. No. 14/534,980, filed Nov. 6, 2014, which claims priority to U.S. Provisional Application No. 61/933,060, filed Jan. 29, 2014, both of which are hereby incorporated by reference in their entirety and for all purposes.

In some cases, a wearable device may include and/or couple to components that are used to provide audio to a wearer. Such components include ear buds, loudspeakers, and bone conduction speakers.

Additionally or alternatively, some wearable devices include sensory systems that allow a wearable device to determine whether or not it is being worn. Examples of such sensory systems include capacitive touch sensors to determine when the wearable is in contact with a wearer, proximity sensors to determine when the wearable device is near to or contacting the wearer, and inertial sensors to detect motion characteristic of the wearable device being worn.

SUMMARY

Described herein are embodiments that relate to or take the form of bone-conduction speaker (also referred to as a "vibration transducer" or "bone conduction transducer"), which is movably attached to a wearable device in a manner that provides an indication as to whether or not the device is being worn. In particular, a BCT may be attached to a wearable device by a movable member, which also includes a conductive pad. The conductive pad may be arranged opposite of an exposed terminal for an on-head detection (OHD) circuit arranged within the frame of the wearable device. The OHD circuit is configured as an open circuit, which can be completed when a conductor contacts the exposed terminal. Accordingly, the moveable member is arranged such that its conductive pad moves into contact with and completes the OHD circuit when the device is donned (i.e., worn), and is separated from the OHD circuit when the device is doffed (i.e., not worn). Accordingly, the state of the OHD circuit (either open or closed) may indicate whether or not the device is being worn.

In one aspect, an example apparatus includes: (a) a frame component for a wearable device, wherein the frame component comprises a contact feature for a circuit at least partially disposed in the frame component; (b) a member movably coupled to the frame component, wherein the member is also coupled to a vibration transducer; (c) at least one conductive pad coupled to the member and aligned with the contact feature in the frame component; and (d) a first spring and a second spring extending from the member, wherein the first and the second spring have a first and a second spring constant, respectively. The first spring and the second spring interface with the frame component, such that a difference between the first spring constant and the second spring constant results in a resting position of the member in which the conductive pad is separated from the contact feature, thereby opening the circuit. Further, when the wearable device is worn, the member is positioned so as to press the vibration transducer against the wearer and compress the first spring, thereby moving the conductive pad into contact with the contact feature and completing the circuit In another aspect, an example apparatus includes: (a) a member coupled to a vibration transducer, wherein the member is also configured to couple to a frame component of a wearable device comprising a contact feature for a circuit; (b) at least one conductive pad coupled to the member and arranged to align with the contact feature in the frame component; and (c) a first spring and a second spring extending from the member, wherein the first and the second spring have a first and a second spring constant, respectively. The member is configured such that, when the member is coupled to the frame component, the first spring and the second spring interface with the frame component such that a difference between the first spring constant and the second spring constant results in a resting position of the member in which the conductive pad is separated from the contact feature, thereby opening the circuit. Further, when the wearable device is worn, the member presses the vibration transducer against the wearer and compresses the first spring, thereby moving the conductive pad into contact with the contact feature and completing the circuit.

In a further aspect, an example wearable device includes: (a) a frame comprising a contact feature for a circuit disposed therein; (b) a member movably coupled to the frame component; (c) a vibration transducer coupled to the member; (d) at least one conductive pad coupled to the member and aligned with the contact feature in the frame component; (e) a first spring and a second spring extending from the member, wherein the first and the second spring have a first and a second spring constant, respectively. The first spring and the second spring interface with the frame component such that a difference between the first spring constant and the second spring constant results in a resting position of the member in which the conductive pad is separated from the contact feature, thereby opening the circuit. Further, when the wearable device is worn, the member is positioned so as to press the vibration transducer against the wearer and compress the first spring, thereby moving the conductive pad into contact with the contact feature and completing the circuit. Additionally, the wearable device includes a control system (e.g., a processor and program instructions stored in memory) operable to determine when the circuit is closed, and to interpret a determination that the circuit is closed as an indication that the wearable device is being worn.

These as well as other aspects, advantages, and alternatives, will become apparent to those of ordinary skill in the art by reading the following detailed description, with reference where appropriate to the accompanying drawings.

DETAILED DESCRIPTION

Figure 1A:
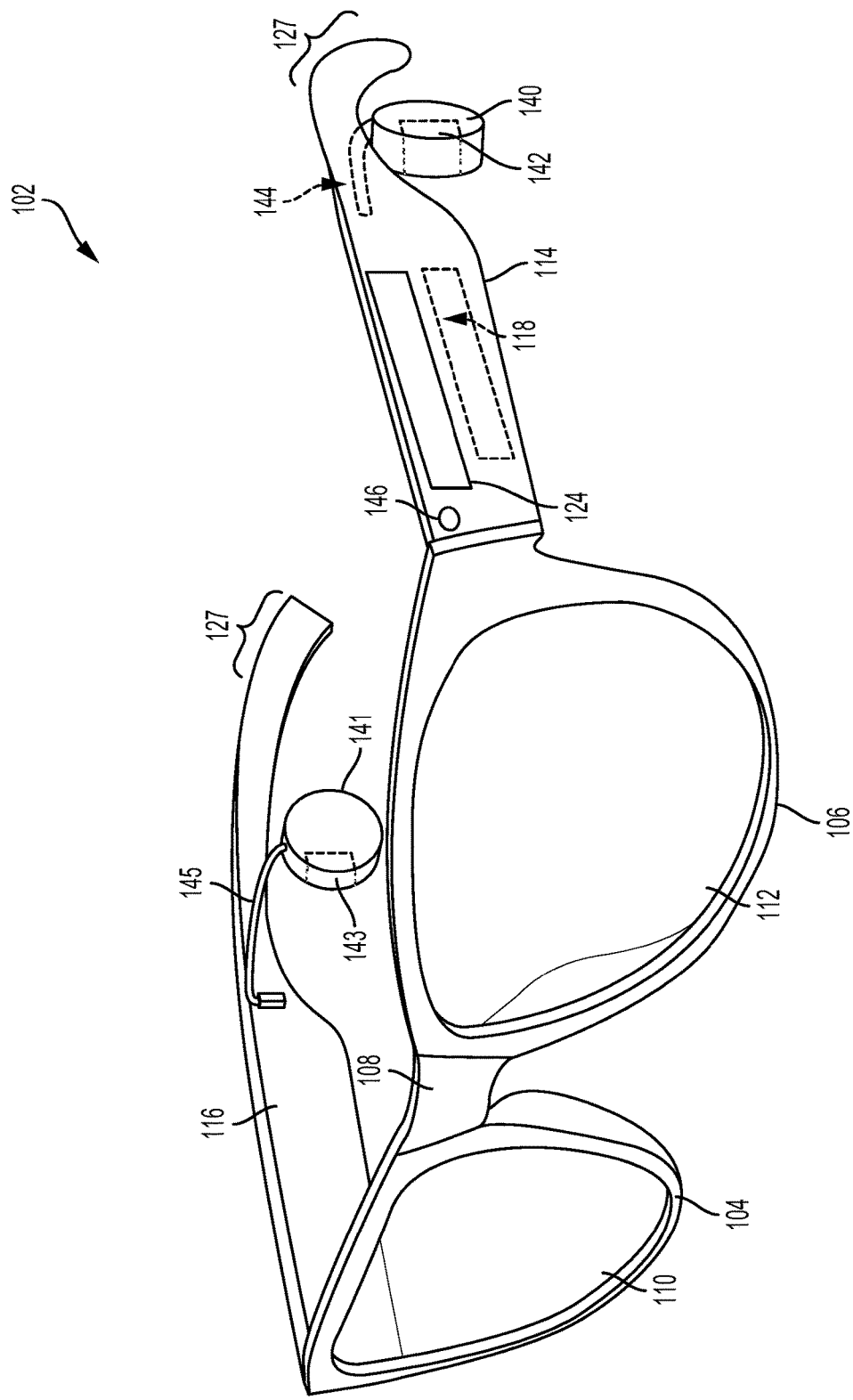
FIG. 1A illustrates a wearable computing device, according to an exemplary embodiment.

Exemplary methods and systems are described herein. It should be understood that the word "exemplary" is used herein to mean "serving as an example, instance, or illustration." Any embodiment or feature described herein as "exemplary" or as an "example" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

I. OVERVIEW

For various reasons, it may be desirable for a wearable computing device, such as an ear-piece device or headset, a glasses-style device, or a watch computing device, to have the ability to determine whether or not it is being worn. Since wearable devices are intended to be worn, the fact that a device is not being worn may serve as an indication that the device is not in use. Therefore, a wearable device may dynamically enable and disable certain power-hungry components and functionality according to whether or not the device is being worn.

For example, a wearable device can utilize knowledge of its donned or doffed state to extend the amount of time a wearable device can operate on a single charge of its battery (i.e., to extend its battery life). Specifically, when a wearable device determines that it is not being worn, the wearable device can turn off certain sensors and chipsets, and/or disable certain functions, which are considered unnecessary when the device is not in use. Note that taking such power-saving actions may be referred to as operating in "sleep" mode or a "low-power" mode.

As another example, a wearable device may enable security features when it determines it is not being worn. Specifically, if a device determines it is not being worn, this may be interpreted as an indication that the device's owner is not using, and perhaps is not in possession of, their device. As such, the wearable device may disable certain features and/or functions, and require a user enter authentication information (e.g., a passcode, fingerprint scan, etc.) before these features and/or functions can be utilized again. Note that taking such actions to secure a wearable device may be referred to as "locking" the wearable device.

Example embodiments may include or relate to a member having a vibration transducer, which attaches to a wearable device functions as a bone conduction speaker (also referred to as a bone conduction transducer or "BCT"). In addition to providing audio via the BCT, the member may be moveably attached to the wearable device, such that the positioning of the member provides an indication as to whether or not the device is donned (i.e., being worn) or doffed (i.e., not being worn).

More specifically, the BCT member may be a modular component, which can be attached to and detached from the frame of a wearable device. In particular, the BCT member may be moveably attached to the frame of the wearable device with a ball-and-socket joint, and may further include two springs that interface with the wearable frame at an attachment location. The springs may have differing spring constants, and may interface with the wearable's frame in a manner that biases the member to press the BCT against the wearer's body (and thereby provide audio to the wearer by vibrating the wearer's bone structure). The corresponding force which the wearer's body exerts on the BCT may compress the springs and thereby move the member from its natural resting position.

Further, the wearable device may include an on-head detection (OHD) circuit. The OHD circuit is a partial (i.e., incomplete) circuit disposed in the frame, which can be completed when a conductive material is brought into contact with its contact feature. Accordingly, an example BCT member may further include a conductive pad that is positioned opposite of the contact feature of the OHD circuit. The conductive pad may be arranged such that: (i) when the BCT is pressed against the wearer and the member moves from its resting position, the conductive pad is pressed against the contact feature, thereby completing the OHD circuit disposed in the frame, and (ii) when the wearable is not being worn and the BCT member returns to its resting position, the conductive pad is separated from the contact feature, such that the OHD circuit is opened. As such, the wearable device may interpret completion of the OHD circuit as an indication that the wearable device is being worn, and may interpret an open OHD circuit as an indication that the device is not being worn.

As a specific example, a modular "L-shaped" member may be attached to the side-arm of a glasses-style wearable device. This L-shaped member may be attached at a location on the side-arm that places the BCT behind the wearer's ear. The member may be removably attached to the wearable frame with a ball-and-socket joint allowing for one-degree of freedom, and may include springs to the front and rear of the joint (e.g., anterior and posterior of the joint). The rear spring may have a greater spring constant than the front spring, such that the member is biased to press the BCT against the back of the wearer's ear. Without this bias, the upper surface of the member could sit flush against or parallel to the lower surface of the BCT frame. However, because the springs bias the member towards the back of the ear, a rear portion of the member's upper surface may separate from the BCT frame when the wearable device is not being worn (and the member thus returns to its resting position).

Accordingly, a conductive pad may be placed on the rear portion of the member's upper surface, and an exposed terminal for an on-head detection (OHD) circuit may be located on a lower surface of the wearable device's frame, opposite of the conductive pad. With this arrangement, the conductive pad separates from the exposed terminal when the device is not being worn (leaving the OHD circuit open), but moves into contact with the exposed terminal when the device is worn (thus completing the OHD circuit). Accordingly, the wearable device may interpret completion of the OHD circuit as an indication that the wearable device is being worn, and vice versa.

Notably, the spring interface on an example BCT member may bias the member so as to provide a BCT having a comfortable but snug fit against the wearer. Thus, an example BCT member may help to balance the desire for high-quality audio quality with desire for an ergonomic fit. Advantageously, by adding the conductive pad and exposed contact feature for an open circuit in the wearable frame, the mechanics that provide a desirable fit for a BCT can also be utilized to obtain an on-head detection signal.

In a further aspect of some embodiments, the springs on a BCT member can also serve as part of an audio-signal path to the BCT. For example, the springs that provide the interface between the BCT member and the wearable frame may be connected to the input terminals of the BCT at one end of the member, and may contact audio terminals on the BCT frame at the other end of the member. Configured as such, the springs may relay an audio signal from the wearable device's audio source to the BCT. This arrangement may be particularly useful in a modular embodiment, since attaching and detaching the BCT member from the wearable from will also connect and disconnect the wearable device's audio source from the BCT.

In a further aspect, a wearable device, such as a glasses-style device, may have multiple attachment locations for a modular BCT member. These multiple attachment locations may all be configured to provide the same information regarding whether the device is being worn, and/or may all include audio terminals for relaying audio signals to the BCT via the BCT member's interfacing springs. By providing multiple attachment points, a wearable device may help users with differently shaped bodies achieve a better fit.

II. ILLUSTRATIVE WEARABLE COMPUTING DEVICES

Systems and devices in which exemplary embodiments may be implemented will now be described in greater detail. However, an exemplary system may also be implemented in or take the form of other devices, without departing from the scope of the invention.

An exemplary embodiment may be implemented in a wearable computing device that facilitates voice-based user interactions. However, embodiments related to wearable devices that do not facilitate voice-based user interactions are also possible. An illustrative wearable device may include an ear-piece with a bone-conduction speaker (e.g., a bone conduction transducer or "BCT"). A BCT may be arranged so as to contact the wearer and vibrate the wearer's bone structure when driven by an audio signal. The vibrations travel through the wearer's bone structure to the wearer's middle ear, such that the brain interprets the vibrations as sounds. The wearable device may take the form of an earpiece with a BCT, which can be tethered via a wired or wireless interface to a user's phone, or may be a stand-alone earpiece device with a BCT. Alternatively, the wearable device may be a glasses-style wearable device that includes one or more BCTs and has a form factor that is similar to traditional eyeglasses. Other types of wearable devices are also possible.

FIG. 1A illustrates a wearable computing device 102, according to an exemplary embodiment. In FIG. 1A, the wearable computing device 102 takes the form of glasses-style wearable computing device. Note that wearable computing device 102 may also be considered an example of a head-mountable device (HMD), and thus may also be referred to as an HMD 102. It should be understood, however, that exemplary systems and devices may take the form of or be implemented within or in association with other types of devices, without departing from the scope of the invention. As illustrated in FIG. 1A, the wearable computing device 102 comprises frame elements including lens-frames 104, 106 and a center frame support 108, lens elements 110, 112, and extending side-arms 114, 116. The center frame support 108 and the extending side-arms 114, 116 are configured to secure the wearable computing device 102 to a user's head via placement on a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the head-mounted device 102. Other materials are possible as well. Each of the lens elements 110, 112 may also be sufficiently transparent to allow a user to see through the lens element.

The extending side-arms 114, 116 may each be projections that extend away from the lens-frames 104, 106, respectively, and may be positioned behind a user's ears to secure the HMD 102 to the user's head. The extending side-arms 114, 116 may further secure the HMD 102 to the user by extending around a rear portion of the user's head. Additionally or alternatively, for example, the HMD 102 may connect to or be affixed within a head-mountable helmet structure. Other possibilities exist as well.

The HMD 102 may also include an on-board computing system 118 and at least one finger-operable touch pad 124. The on-board computing system 118 is shown to be integrated in side-arm 114 of HMD 102. However, an on-board computing system 118 may be provided on or within other parts of the head-mounted device 102 or may be positioned remotely from and communicatively coupled to a head-mountable component of a computing device (e.g., the on-board computing system 118 could be housed in a separate component that is not head wearable, and is wired or wirelessly connected to a component that is head wearable). The on-board computing system 118 may include a processor and memory, for example. Further, the on-board computing system 118 may be configured to receive and analyze data from a finger-operable touch pad 124 (and possibly from other sensory devices and/or user interface components).

In a further aspect, an HMD 102 may include various types of sensors and/or sensory components. For instance, HMD 102 could include an inertial measurement unit (IMU) (not explicitly shown in FIG. 1A), which provides an accelerometer, gyroscope, and/or magnetometer. In some embodiments, an HMD 102 could also include an accelerometer, a gyroscope, and/or a magnetometer that is not integrated in an IMU.

In a further aspect, HMD 102 may include sensors that facilitate a determination as to whether or not the HMD 102 is being worn. For instance, sensors such as an accelerometer, gyroscope, and/or magnetometer could be used to detect motion that is characteristic of the HMD being worn (e.g., motion that is characteristic of user walking about, turning their head, and so on), and/or used to determine that the HMD is in an orientation that is characteristic of the HMD being worn (e.g., upright, in a position that is typical when the HMD is worn over the ear). Accordingly, data from such sensors could be used as input to an on-head detection process. Additionally or alternatively, HMD 102 may include a capacitive sensor or another type of sensor that is arranged on a surface of the HMD 102 that typically contacts the wearer when the HMD 102 is worn. Accordingly data provided by such a sensor may be used to determine whether or not the HMD is being worn. Other sensors and/or other techniques may also be used to detect when the HMD is being worn.

HMD 102 also includes at least one microphone 146, which may allow the HMD 102 to receive voice commands from a user. The microphone 146 may be a directional microphone or an omni-directional microphone. Further, in some embodiments, an HMD 102 may include a microphone array and/or multiple microphones arranged at various locations on the HMD.

In FIG. 1A, touch pad 124 is shown as being arranged on side-arm 114 of the HMD 102. However, the finger-operable touch pad 124 may be positioned on other parts of the HMD 102. Also, more than one touch pad may be present on the head-mounted device 102. For example, a second touchpad may be arranged on side-arm 116. Additionally or alternatively, a touch pad may be arranged on a rear portion 127 of one or both side-arms 114 and 116. In such an arrangement, the touch pad may arranged on an upper surface of the portion of the side-arm that curves around behind a wearer's ear (e.g., such that the touch pad is on a surface that generally faces towards the rear of the wearer, and is arranged on the surface opposing the surface that contacts the back of the wearer's ear). Other arrangements of one or more touch pads are also possible.

The touch pad 124 may sense the touch and/or movement of a user's finger on the touch pad via capacitive sensing, resistance sensing, or a surface acoustic wave process, among other possibilities. In some embodiments, touch pad 124 may be a one-dimensional or linear touchpad, which is capable of sensing touch at various points on the touch surface, and of sensing linear movement of a finger on the touch pad (e.g., movement forward or backward along the side-arm 124). In other embodiments, touch pad 124 may be a two-dimensional touch pad that is capable of sensing touch in any direction on the touch surface. Additionally, in some embodiments, touch pad 124 may be configured for near-touch sensing, such that the touch pad can sense when a user's finger is near to, but not in contact with, the touch pad. Further, in some embodiments, touch pad 124 may be capable of sensing a level of pressure applied to the pad surface.

In a further aspect, earpiece 140 and 141 are attached to side-arms 114 and 116, respectively. Earpieces 140 and 141 can each include a BCT 142 and 143, respectively. Each earpiece 140, 141 may be arranged such that when the HMD 102 is worn, each BCT 142, 143 is positioned to the posterior of a wearer's ear. For instance, in an exemplary embodiment, an earpiece 140, 141 may be arranged such that a respective BCT 142, 143 can contact the auricle of both of the wearer's ear. Other arrangements of earpieces 140, 141 are also possible. Further, embodiments with a single earpiece 140 or 141 are also possible.

In an exemplary embodiment, a BCT, such as BCT 142 and/or BCT 143, may operate as a bone-conduction speaker. For instance, a BCT may be implemented with a vibration transducer that is configured to receive an audio signal and to vibrate a wearer's bone structure in accordance with the audio signal. More generally, it should be understood that any component that is arranged to vibrate a wearer's bone structure may be incorporated as a bone-conduction speaker, without departing from the scope of the invention.

In a further aspect, HMD 102 may include at least one audio source (not shown) that is configured to provide an audio signal that drives BCT 142 and/or BCT 143. For instance, in an exemplary embodiment, an HMD 102 may include an internal audio playback device such as an on-board computing system 118 that is configured to play digital audio files. Additionally or alternatively, an HMD 102 may include an audio interface to an auxiliary audio playback device (not shown), such as a portable digital audio player, a smartphone, a home stereo, a car stereo, and/or a personal computer, among other possibilities. In some embodiments, an application or software-based interface may allow for the HMD 102 to receive an audio signal that is streamed from another computing device, such as the user's mobile phone. An interface to an auxiliary audio playback device could additionally or alternatively be a tip, ring, sleeve (TRS) connector, or may take another form. Other audio sources and/or audio interfaces are also possible.

Further, in an embodiment with two ear-pieces 140 and 141, which both include BCTs, the ear-pieces 140 and 141 may be configured to provide stereo audio. However, non-stereo audio is also possible in devices that include two ear-pieces.

Figure 1B:
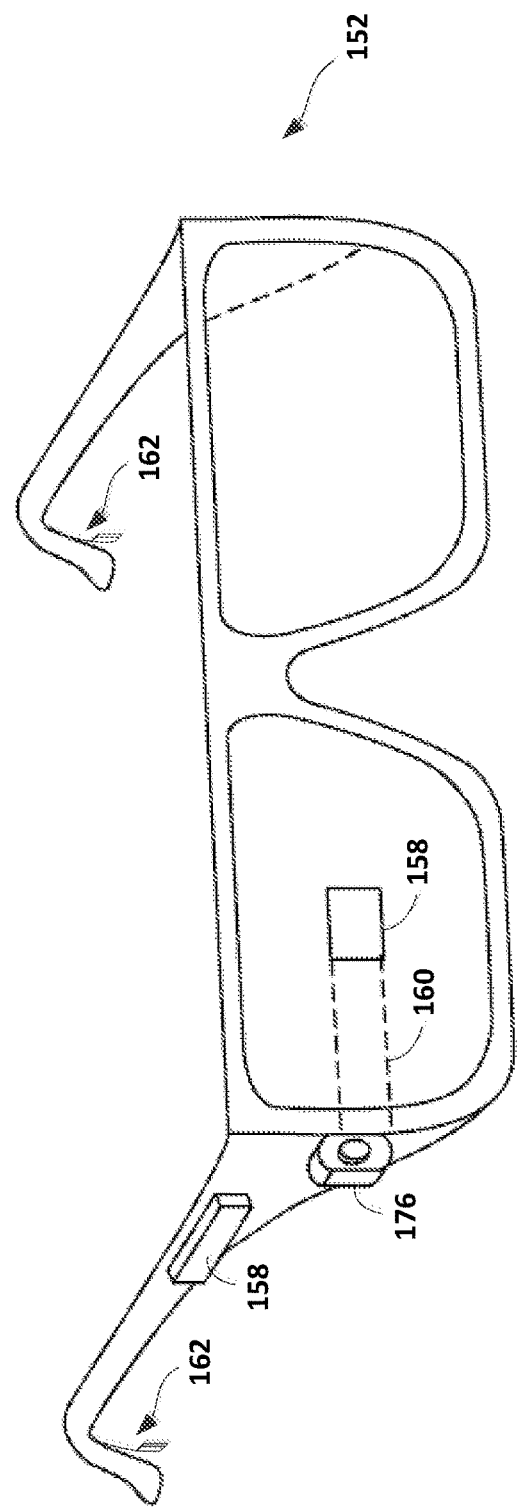
FIG. 1B illustrates another wearable computing device, according to an exemplary embodiment.

Note that in the example shown in FIG. 1A, HMD 102 does not include a graphical display. FIG. 1B shows another wearable computing device 152 according to an example embodiment, which is similar to the HMD shown in FIG. 1B but includes a graphical display. In particular, the wearable computing device shown in FIG. 1B takes the form of a glasses-style HMD 152 with a near-eye display 158. As shown, HMD 152 may include BCTs 162 that is configured and functions similarly to BCTs 142 and 143, an onboard computing system 158 that is configured and functions similarly to onboard computing system 118, and a microphone 176 that is configured and functions similarly to microphone 146. HMD 152 may additionally or alternatively include other components, which are not shown in FIG. 1B.

HMD 152 includes a single graphical display 158, which may be coupled to the on-board computing system 158, to a standalone graphical processing system, and/or to other components of HMD 152. The display 158 may be formed on one of the lens elements of the HMD 152, such as a lens element described with respect to FIG. 1A, and may be configured to overlay computer-generated graphics in the wearer's field of view, while also allowing the user to see through the lens element and concurrently view at least some of their real-world environment. (Note that in other embodiments, a virtual reality display that substantially obscures the user's view of the physical world around them is also possible.) The display 158 is shown to be provided in a center of a lens of the HMD 152, however, the display 158 may be provided in other positions, and may also vary in size and shape. The display 158 may be controllable via the computing system 154 that is coupled to the display 158 via an optical waveguide 160.

Other types of near-eye displays are also possible. For example, a glasses-style HMD may include one or more projectors (not shown) that are configured to project graphics onto a display on an inside surface of one or both of the lens elements of HMD. In such a configuration, the lens element(s) of the HMD may act as a combiner in a light projection system and may include a coating that reflects the light projected onto them from the projectors, towards the eye or eyes of the wearer. In other embodiments, a reflective coating may not be used (e.g., when the one or more projectors take the form of one or more scanning laser devices).

As another example of a near-eye display, one or both lens elements of a glasses-style HMD could include a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame of the HMD for driving such a matrix display. Alternatively or additionally, a laser or LED source and scanning system could be used to draw a raster display directly onto the retina of one or more of the user's eyes. Other types of near-eye displays are also possible.

Generally, it should be understood that an HMD and other types of wearable devices may include other types of sensors and components, in addition or in the alternative to those described herein. Further, variations on the arrangements of sensory systems and components of an HMD described herein, and different arrangements altogether, are also possible.

Figure 2A:
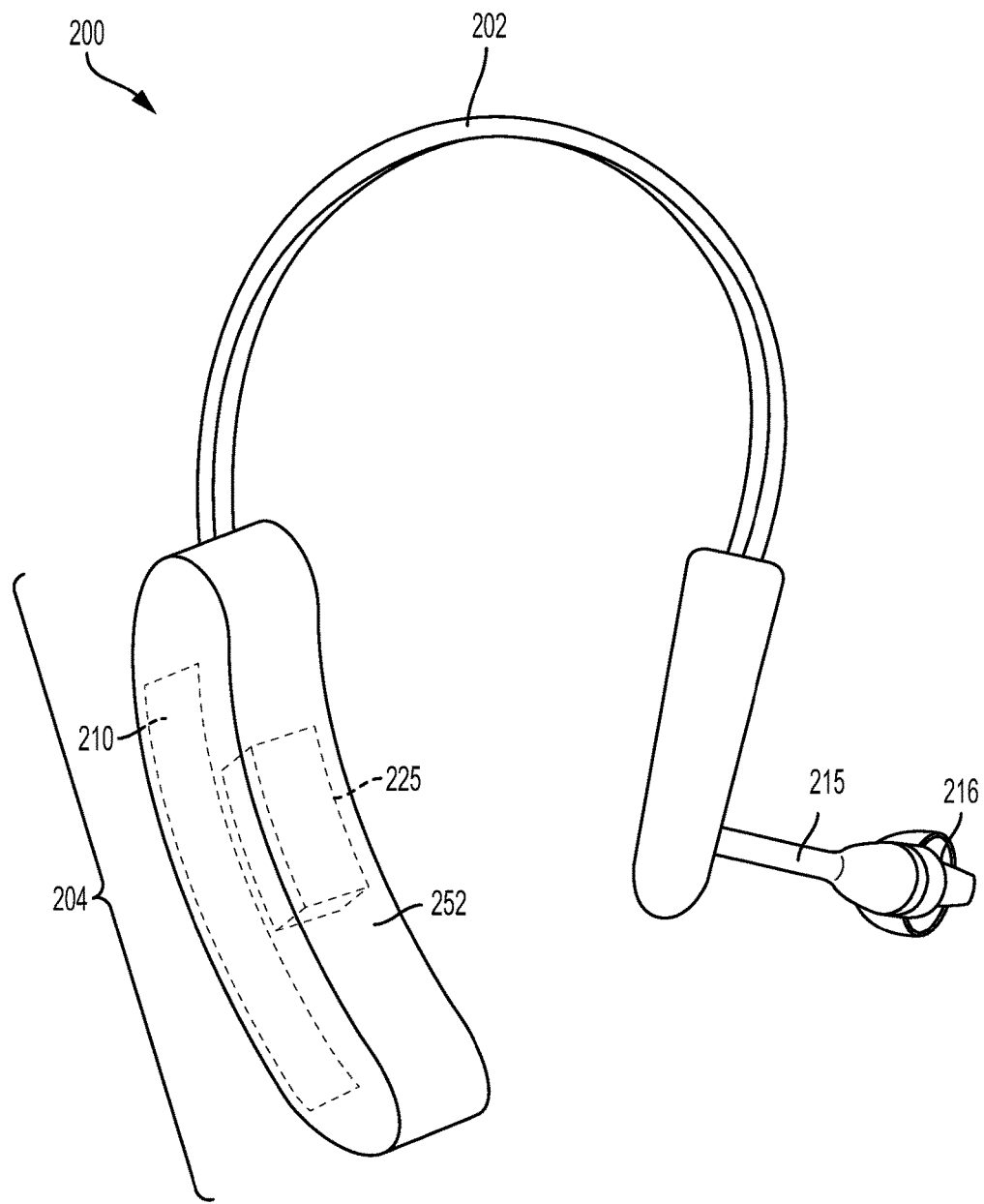
FIGS. 2A to 2C show another wearable computing device according to an example embodiment.
Figure 2C:
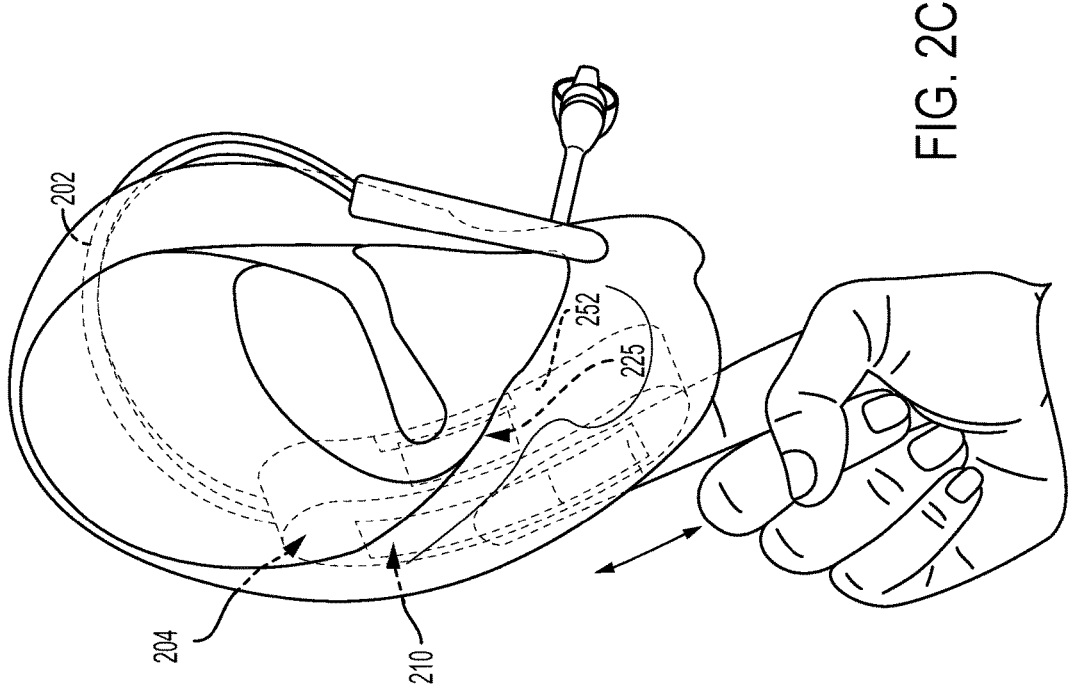
Figure 2B:
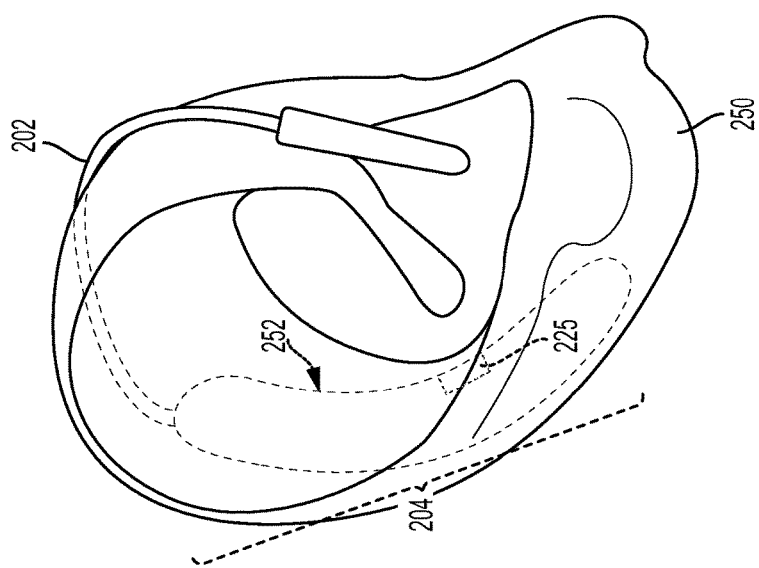

FIGS. 2A to 2C show another wearable computing device according to an example embodiment. More specifically, FIGS. 2A to 2C shows an earpiece device 200, which includes a frame 202 and a behind-ear housing 204. As shown in FIG. 2B, the frame 202 is curved, and is shaped so as to hook over a wearer's ear 250. When hooked over the wearer's ear 250, the behind-ear housing 204 is located behind the wearer's ear, For example, in the illustrated configuration, the behind-ear housing 204 is located behind the auricle, such that a surface 252 of the behind-ear housing 204 contacts the wearer on the back of the auricle.

Note that the behind-ear housing 204 may be partially or completely hidden from view, when the wearer of earpiece device 200 is viewed from the side. As such, an earpiece device 200 may be worn more discreetly than other bulkier and/or more visible wearable computing devices.

Referring back to FIG. 2A, the behind-ear housing 204 may include a BCT 225. Note that BCT 225 is provided as an example of a BCT generally. While the BCT configuration shown in FIGS. 2A to 2C differs from those described later in reference to FIGS. 4A to 6, it should be understood that the BCT functionality described in reference to BCT 225 may apply equally to BCTs configured as shown in FIGS. 4A to 6, and to other BCT configurations as well.

BCT 225 may be, for example, a vibration transducer or an electro-acoustic transducer that produces sound in response to an electrical audio signal input. As such, BCT 225 may function as a bone-conduction speaker that plays audio to the wearer by vibrating the wearer's bone structure. Other types of BCTs are also possible. Generally, a BCT may be any structure that is operable to directly or indirectly vibrate the bone structure of the user.

As shown in FIG. 2C, BCT 225 may be arranged on or within the behind-ear housing 204 such that when the earpiece device 200 is worn, BCT 225 is positioned posterior to the wearer's ear, in order to vibrate the wearer's bone structure. More specifically, BCT 225 may form at least part of, or may be vibrationally coupled to the material that forms, surface 252 of behind-ear housing 204. Further, earpiece device 200 may be configured such that when the device is worn, surface 252 is pressed against or contacts the back of the wearer's ear. As such, BCT 225 may transfer vibrations to the wearer's bone structure via surface 252. Other arrangements of a BCT on an earpiece device are also possible, including but not limited to those described in greater detail in reference to FIGS. 4A to 6B.

As further shown in FIGS. 2A to 2C, the earpiece device 200 also includes a touch pad 210. The touch pad 210 may arranged on a surface of the behind-ear housing 204 that curves around behind a wearer's ear (e.g., such that the touch pad is generally faces towards the wearer's posterior when the earpiece device is worn). Other arrangements are also possible.

In some embodiments, touch pad 210 may be a one-dimensional or linear touchpad, which is capable of sensing touch at various points on the touch surface, and of sensing linear movement of a finger on the touch pad (e.g., movement upward or downward on the back of the behind-ear housing 204). In other embodiments, touch pad 210 may be a two-dimensional touch pad that is capable of sensing touch in any direction on the touch surface. Additionally, in some embodiments, touch pad 210 may be configured for near-touch sensing, such that the touch pad can sense when a user's finger is near to, but not in contact with, the touch pad. Further, in some embodiments, touch pad 210 may be capable of sensing a level of pressure applied to the pad surface.

In the illustrated embodiment, earpiece device 200 also includes a microphone arm 215, which may extend towards a wearer's mouth, as shown in FIG. 2B. Microphone arm 215 may include a microphone 216 that is distal from the earpiece. Microphone 216 may be an omni-directional microphone or a directional microphone. Further, an array of microphones could be implemented on a microphone arm 215. Alternatively, a bone conduction microphone (BCM), could be implemented on a microphone arm 215. In such an embodiment, the arm 215 may be operable to locate and/or press a BCM against the wearer's face near or on the wearer's jaw, such that the BCM vibrates in response to vibrations of the wearer's jaw that occur when they speak. Note that the microphone arm is 215 is optional, and that other configurations for a microphone are also possible. Further, in some embodiments, ear bud 215 may be a removable component, which can be attached and detached from the earpiece device by the user.

In some embodiments, a wearable device may include two types of microphones: one or more microphones arranged specifically to detect speech by the wearer of the device, and one or more microphones that are arranged to detect sounds in the wearer's environment (perhaps in addition to the wearer's voice). Such an arrangement may facilitate intelligent processing based on whether or not audio includes the wearer's speech.

In some embodiments, a wearable device may include an ear bud (not shown), which may function as a typical speaker and vibrate the surrounding air to project sound from the speaker. Thus, when inserted in the wearer's ear, the wearer may hear sounds in a discrete manner. Such an ear bud is optional, and may be implemented a removable (e.g., modular) component, which can be attached and detached from the earpiece device by the user.

III. ILLUSTRATIVE COMPUTING DEVICES

Figure 3:
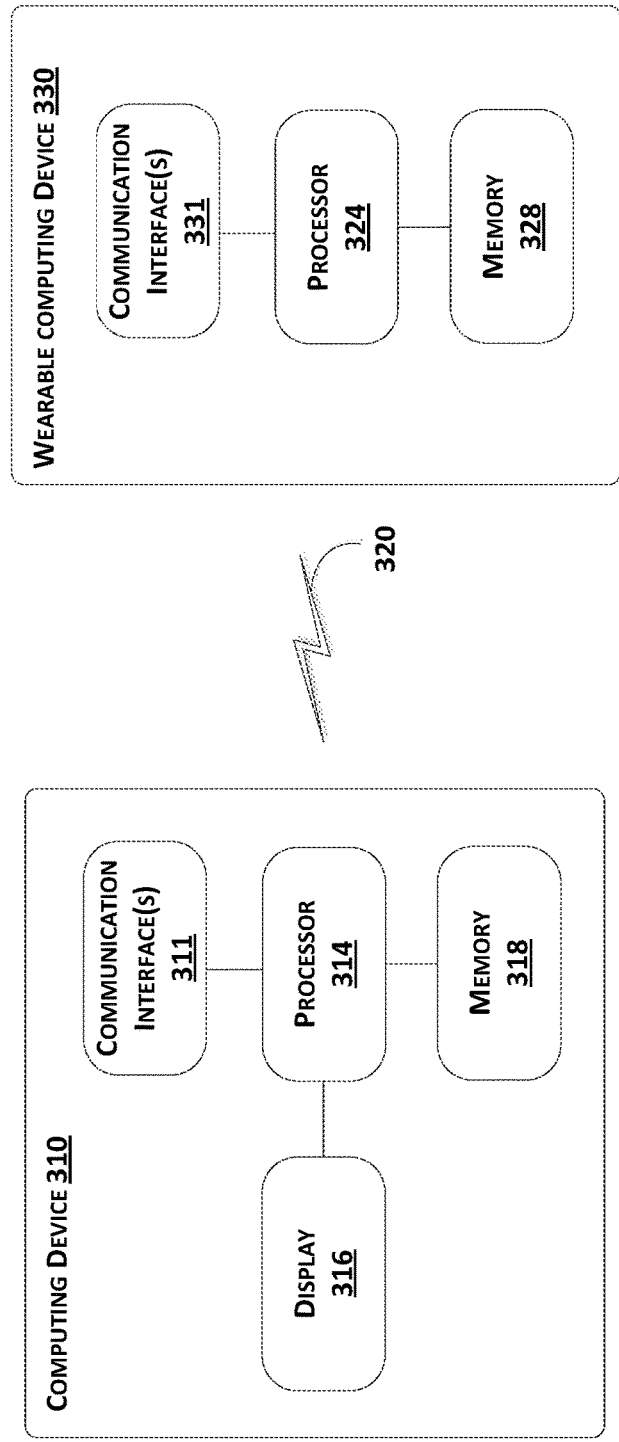
FIG. 3 is a block diagram showing components of a computing device and a wearable computing device, according to an example embodiment.

FIG. 3 is a block diagram showing basic components of a computing device 310 and a wearable computing device 330, according to an example embodiment. In an example configuration, computing device 310 and wearable computing device 330 are operable to communicate via a communication link 320 (e.g., a wired or wireless connection). Computing device 310 may be any type of device that can receive data and display information corresponding to or associated with the data. For example, the computing device 310 may be a mobile phone, a tablet computer, a laptop computer, a desktop computer, or an in-car computer, among other possibilities. Wearable computing device 330 may be a wearable computing device such as those described in reference to FIGS. 1A, 1B, 2A, 2B, and 2C, a variation on these wearable computing devices, or another type of wearable computing device altogether.

The wearable computing device 330 and computing device 310 include hardware and/or software to enable communication with one another via the communication link 320, such as processors, transmitters, receivers, antennas, etc. In the illustrated example, computing device 310 includes one or more communication interfaces 311, and wearable computing device 330 includes one or more communication interfaces 331. As such, the wearable computing device 330 may be tethered to the computing device 310 via a wired or wireless connection. Note that such a wired or wireless connection between computing device 310 and wearable computing device 330 may be established directly (e.g., via Bluetooth), or indirectly (e.g., via the Internet or a private data network).

In a further aspect, note that while computing device 310 includes a graphic display system 316, the wearable computing device 330 does not include a graphic display. In such a configuration, wearable computing device 330 may be configured as a wearable audio device, which allows for advanced voice control and interaction with applications running on another computing device 310 to which it is tethered.

Communication link 320 may be a wired link, such as a universal serial bus or a parallel bus, or an Ethernet connection via an Ethernet port. A wired link may also be established using a proprietary wired communication protocol and/or using proprietary types of communication interfaces. The communication link 320 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

As noted above, to communicate via communication link 320, computing device 310 and wearable computing device 330 may each include one or more communication interface(s) 311 and 331 respectively. The type or types of communication interface(s) included may vary according to the type of communication link 320 that is utilized for communications between the computing device 310 and the wearable computing device 330. As such, communication interface(s) 311 and 331 may include hardware and/or software that facilitates wired communication using various different wired communication protocols, and/or hardware and/or software that facilitates wireless communications using various different wired communication protocols.

Computing device 310 and wearable computing device 330 include respective processing systems 314 and 324. Processors 314 and 324 may be any type of processor, such as a micro-processor or a digital signal processor, for example. Note that computing device 310 and wearable computing device 330 may have different types of processors, or the same type of processor. Further, one or both of computing device 310 and a wearable computing device 330 may include multiple processors.

Computing device 310 and a wearable computing device 330 further include respective on-board data storage, such as memory 318 and memory 328. Processors 314 and 324 are communicatively coupled to memory 318 and memory 328, respectively. Memory 318 and/or memory 328 (any other data storage or memory described herein) may be computer-readable storage media, which can include volatile and/or non-volatile storage components, such as optical, magnetic, organic or other memory or disc storage. Such data storage can be separate from, or integrated in whole or in part with one or more processor(s) (e.g., in a chipset). In some implementations, the data storage 104 can be implemented using a single physical device (e.g., one optical, magnetic, organic or other memory or disc storage unit), while in other implementations, the data storage 104 can be implemented using two or more physical devices.

Memory 318 can store machine-readable program instructions that can be accessed and executed by the processor 314. Similarly, memory 328 can store machine-readable program instructions that can be accessed and executed by the processor 324.

In a further aspect, a communication interface 311 of the computing device 310 may be operable to receive a communication from the wearable audio device that is indicative of whether or not the wearable audio device is being worn. Such a communication may be based on sensor data generated by at least one sensor of the wearable audio device. As such, memory 318 may include program instructions providing an on-head detection module. Such program instructions may to: (i) analyze sensor data generated by a sensor or sensors on the wearable audio device to determine whether or not the wearable audio device is being worn; and (ii) in response to a determination that the wearable audio device is not being worn, lock the wearable audio device (e.g., by sending a lock instruction to the wearable audio device) and/or take other responsive actions.

IV. ILLUSTRATIVE VIBRATION-TRANSDUCER MEMBERS

As noted above, example embodiments may include or take the form of a vibration-transducer member or BCT member, which can be removably or permanently attached a BCT to the frame of a wearable device, and which is configured to provide an electrical and/or mechanical indication as to whether the device is being worn.

Figure 4A:
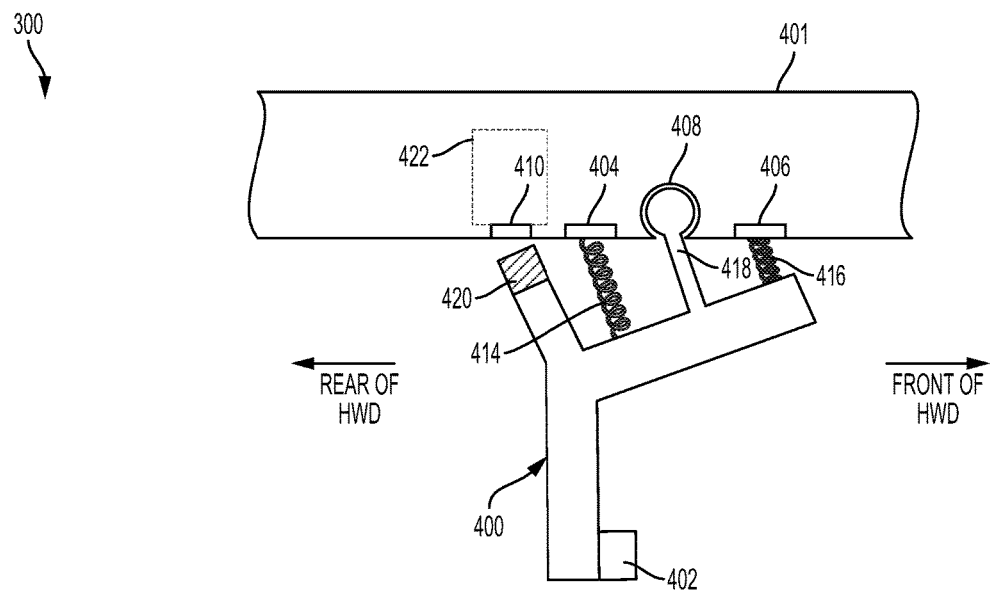
FIGS. 4A to 4C are illustrations of a frame component of a wearable device, according to an example embodiment.
Figure 4B:
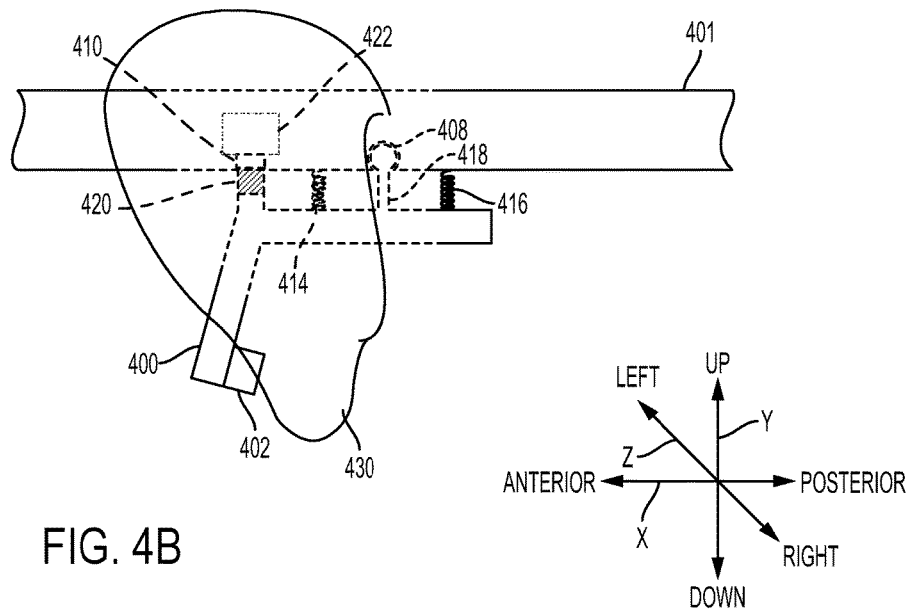
Figure 4C:
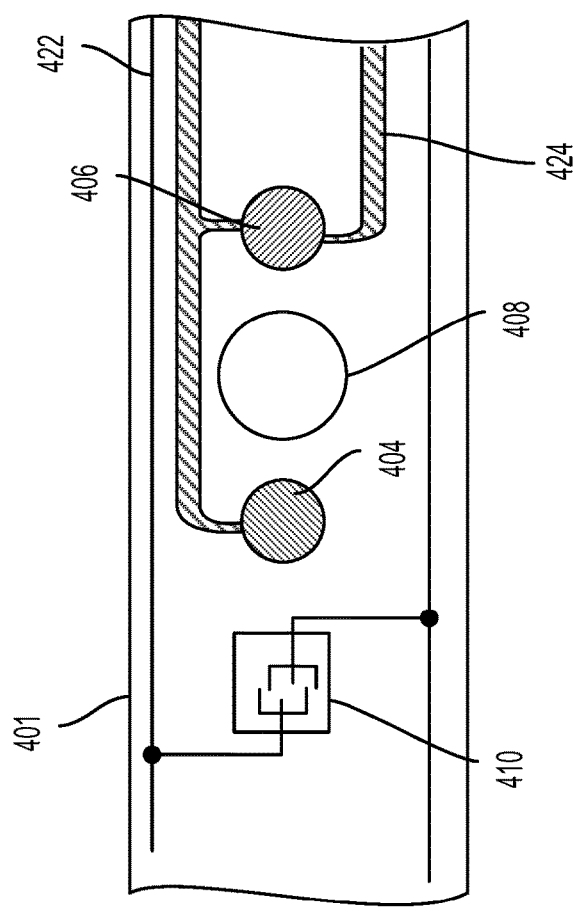

FIGS. 4A to 4C illustrate a vibration-transducer member 400 according to an example embodiment. The frame component 401 shown in FIGS. 4A to 4C may be part of a wearable device such as those illustrated in FIGS. 1A to 2C. For instance, frame component 401 may be a side arm of a glasses-style wearable device, such as those shown in FIGS. 1A and 1B. Member 400 can also be coupled to components of other head wearable devices, or to a wearable device configured to be worn on other parts of the body.

FIGS. 4A and 4B are side-view illustrations of a vibration-transducer member 400 coupled to a frame component 401 of a wearable device, according to an example embodiment. FIG. 4C is a simplified illustration of the underside of the same frame component 401, for which FIGS. 4A and 4B show a side view. As such, FIG. 4C provides a more direct view of the features of the frame component 401 that couple the frame component to member 400.

FIG. 4A illustrates a resting position of the member 400 in which an on-head detection (OHD) circuit 422 disposed in the frame component 401 is open (i.e., an incomplete circuit). Herein, the resting position should of the member should be understood to be a position the member returns to when coupled to the frame component, and no object other than those coupling the member to the frame of the wearable device, is applying force to the member.

Conversely, FIG. 4B illustrates a position of member 400 in which the OHD circuit disposed in the frame component 401 is completed by conductive pad of member 400.

As further shown in FIG. 4B, when the wearable device is worn, the wearer's ear 430 may contact BCT 402 and push member 400 into a position so as to complete the OHD circuit, thereby providing an indication that the wearable device is being worn. Further, when the wearable device is not being worn, member 400 may be configured to return to the resting position shown in FIG. 4A and open the OHD circuit, thereby providing an indication that the wearable device is not being worn.

A. On-Head Detection

Referring to FIG. 4A in greater detail, member 400 includes or is coupled to a vibration transducer 402, which may be configured as a bone conduction transducer (BCT). Further, member 400 includes a male connector 418 that is adapted to connect to a female connector 408 of the frame component 401. In the illustrated example, male connector 418 and female connector 408 provide a ball-and-socket type joint, which allows for movement with one degree of freedom. Configured as such, the member can pivot between the resting position shown in FIG. 4A and the position shown in FIG. 4B. Note that the member 400 may or may not be able to rotate past the positions shown in FIGS. 4A and 4B, depending upon the particular implementation.

It should be understood that male connector 418 is but one example of a connector feature for a BCT member. Other types of connector features for coupling a BCT member to a wearable device are also possible. For instance, in an alternative arrangement, a male connector 418 may be arranged on the frame of the wearable device, and a corresponding female connector may be arranged on the BCT member. Furthermore, the connector feature is not limited to ball-and-socket type joints; other types of joints and connectors may also be utilized to moveably couple the member to the frame of a wearable device. Additionally, connecting features between a BCT member and a wearable frame may allow the member to move with more than one degree of freedom, without departing from the scope of the invention.

Member 400 also includes a conductive pad 420, which is arranged opposite a contact feature 410 of the OHD circuit 422 disposed within frame component 401. The contact feature may be arranged so as to interrupt (i.e., open) the OHD circuit when not in contact with the conductive pad 420 of member 400. Correspondingly, the OHD circuit 422 is completed when conductive pad 420 is moved into contact with the contact feature 410 of the OHD circuit 422.

The conductive pad 420 may be implemented in various ways. For instance, the conductive pad 420 may be a carbon pad, conductive foam, or another soft and/or flexible conductive material. However, more rigid conductive materials may also be utilized. Further, while FIGS. 4A and 4B show the conductive pad 420 arranged on piece extending from an upper surface of "L-shaped" member 400, conductive pad could also be arranged on or within the upper surface of L-shaped member 400. More generally, the size, shape, and/or arrangement of the conductive pad on a vibration-transducer member may vary, depending upon the particular implementation.

In an example embodiment, the contact feature 410 may take the form of a resistive copper button pattern, which is exposed to the exterior of the frame component (e.g., on an underside of the side-arm of a glasses-style wearable device). Alternatively, contact feature 410 could be implemented using various types of mechanical, electrical, and/or electromechanical buttons or switches. As yet another alternative, contact feature could be implemented using various types of sensors, such as a proximity sensor or capacitive touch sensor that detects when conductive pad 420 is close to or contacting the frame component. Other implementations of a contact feature for an OHD circuit are also possible.

Member 400 is also coupled to a first spring 414 and a second spring 416. Due to their relative positioning in the illustrated embodiment, springs 414 and 416 may also be referred to as a posterior spring 414 and an anterior spring 416, respectively. However, this characterization should not be considered limiting.

In the illustrated configuration, springs 414 and 416 interface with frame component 401 of the wearable device. That is, springs 414 and 416 make contact with frame component 401 when member 400 is in its resting position (shown in FIG. 4A), and remain in contact with the frame component 401 when contact with the wearer's ear moves member 400 into the position shown in FIG. 4B. However, in other embodiments, it is possible that one or both springs could separate from the frame component when the member is moved into certain positions.

In a further aspect, the posterior spring 414 has a larger spring constant than anterior spring 416. This difference in spring constants biases member 400 to press vibration transducer 402 against the back of the wearer's ear, and results in a resting position in which the conductive pad 420 is separated from contact feature 410 of the OHD circuit 422, as shown in FIG. 4A. Since the resting position of member 400 separates the conductive pad 420 from contact feature 410, and since conductive pad 420 is pressed against contact 410 when the wearable device is worn (as shown in FIG. 4B), the wearable device interprets completion of the OHD circuit as an indication that the device is being worn.

B. Dual Function of Springs as Audio Relays

In some embodiments, springs 414 and 416 may be formed from a conductive material, and may be used to transmit audio signals to the BCT. In such embodiments, the frame component 401 may include spring contact terminals 404, 406. The spring contact terminals 404, 406 may be formed from or include a conductive material, and may serve to electrically couple the springs 414, 416 to an audio source (not shown) via audio signal lines 424. For instance, spring contact terminals 404 and 406 may be configured as a positive (+) terminal and a negative (−) terminal to a circuit (e.g., audio line 424) that carries a signal from an integrated audio source of the wearable device. As such, the wearable device may output an audio signal that drives the vibration transducer 402 via spring contact terminals 404 and 406 and springs 414 and 416.

In some embodiments, spring contact terminals 404, 406 may be recessed within detents of a wearable device's frame. Such detents may be sized and shaped to accept springs 414 and 416, respectively. Alternatively, spring contact terminals 404, 406 may be flush with the surface of the wearable device's frame. Other configurations of spring contact terminals are also possible.

C. PCB Configuration

In an example embodiment, spring contact terminals 404 and 406, contact feature 410, OHD circuit 422, and/or audio line 424 may be disposed on a printed circuit board (PCB). Further, in some embodiments, a flexible PCB may be utilized. The PCB may be arranged within a frame component 401 of a wearable device; or more specifically, within a housing that forms an outer shell of the frame component. For example, the PCB may be disposed in a plastic or metal side-arm of a glasses-style wearable device. Such a frame-component housing may have one or more cavities that expose spring contact terminals 404 and 406, such that the spring contact terminals 404 and 406 can electrically couple to springs 414 and 416 of member 400. Additionally or alternatively, a frame-component housing may have one or more cavities that expose contact feature 410, such that conductive pad 420 can come into contact with and/or electrically couple with contact feature 410 to complete the OHD circuit.

D. Modular Vibration-Transducer Members

In a further aspect, male connector 418 and female connector 408 may be sized and shaped such that the member 400 can be removably attached to the frame component 401. Configured as such, member 400 can be a modular component of a wearable device, which the user can attach and remove as they see fit.

In a modular configuration, a wearable device may include two or more attachment locations. The inclusion of multiple attachment locations allows different users to customize the fit of a BCT to better suit their needs. For example, when member 400 is implemented on a glasses-style wearable device, and BCT 402 is designed to contact the posterior of the wearer's ear, a single location for attachment of the member 400 may be insufficient to properly locate the BCT for all users. However, if multiple attachment locations are provided on the same side-arm of the glasses-style device, each user can attach the member at a location that better fits the size of their head. For example, users with differently sized and/or shaped heads can attach the member at different locations on the side-arm to achieve a similar fit (e.g., with the BCT firmly, but not uncomfortably, pressed against the back of their ear by member 400).

Figure 5:
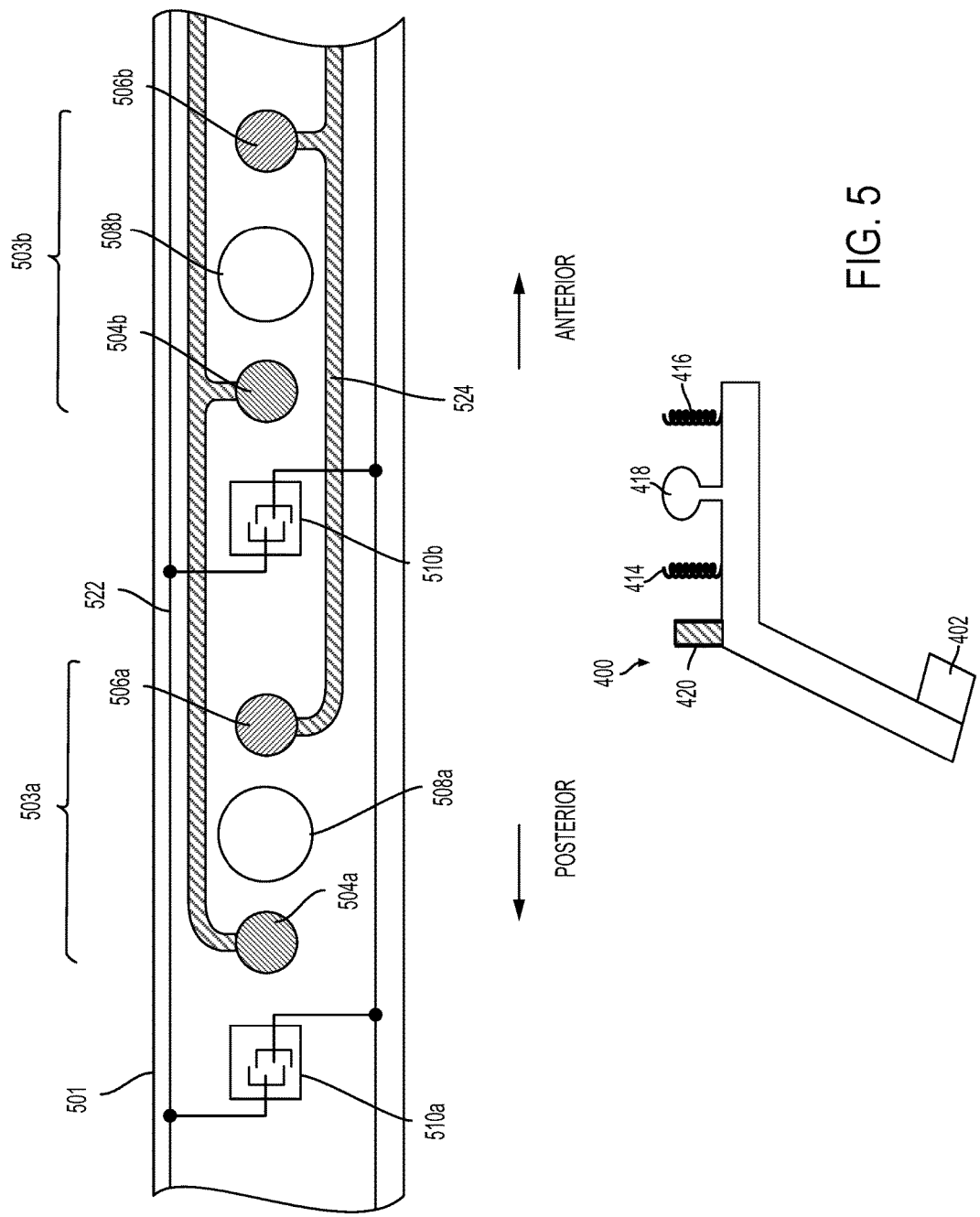
FIG. 5 is a view of the underside of s frame component to which an example member can be attached, according to an example embodiment.

FIG. 5 is a view of the underside of another frame component 501 to which member 400 can be attached, according to an example embodiment. Frame component 501 is similar to frame component 401, except that frame component 501 provides multiple locations for attaching a vibration-transducer member 400.

Frame component 501 provides a first attachment location 503a and a second attachment location 503b. The first attachment location 503a includes female connector feature 508a, as well as spring contact features 504a and 506a. The second attachment location 503b includes female connector feature 508b, as well as spring contact features 504b and 506b. Additionally, a frame component adapted for multiple attachment locations may include multiple contact features for an OHD circuit. For instance, the frame component 501 illustrated in FIG. 5 includes a first contact feature 510a, which corresponds to the first attachment location 503a, and a second contact feature 510b, which corresponds to attachment location 503b.

The first and second attachment locations 503a and 503b are configured such that member 400 can be coupled to either attachment location, and can be moved back and forth between attachment locations as the user sees fit. More specifically, member 400 can be attached at the first attachment location 503a by coupling the member's male connector 418 to female connector 503a, or can be attached at the second attachment location 503b by coupling the member's male connector 418 to female connector 503b.

To help the user more easily move the vibration-transducer member 400 between different attachment locations, the OHD circuit 522 may be designed such that it is open when none of the contact features are in contact with a conductive material, and such that the OHDC circuit can be completed by contacting any one of the contact features with a conductive material. Configured as such, OHD functionality may be provided regardless of which attachment location is used, without requiring any user input to indicate which attachment location is being used.

For instance, in frame component 501, contact features 510a and 510b are connected in parallel to OHD circuit 522. Thus, if conductive pad 420 is separated from both contact features 510a and 510b, OHD circuit 522 will be open. Accordingly, the open circuit may be detected and interpreted as an indication that the wearable device is not being worn. And, when conductive pad 420 contacts either the first contact feature 510a or the second contact feature 510b, the OHD circuit 522 will be completed. Therefore, the closed circuit may be detected and interpreted as an indication that the wearable device is being worn.

Additionally or alternatively, audio connections (e.g., spring contact points) may be provided at each attachment location, such that the same audio source can drive vibration transducer, regardless of which attachment location the vibration-transducer member is attached to. For example, as shown in FIG. 5, spring contact features 504a, 506a and spring contact features 504a, 506a provide parallel connections to audio line 524. More specifically, when member 400 is attached at the first attachment location 503a (e.g., by coupling male connector 418 to female connector 508a), springs 414 and 416 may be coupled to spring contact features 504a and 506a, thereby connecting vibration transducer 402 to audio circuit 524 via springs 414 and 416. And, when member 400 is attached at the second attachment location 503b, springs 414 and 416 may be coupled to spring contact features 504b and 506b, which also connects vibration transducer 402 to audio circuit 524 via springs 414 and 416.

In practice, frame component 501 could be part of a side-arm of glasses-style wearable device, such as that shown in FIG. 1A. The multiple attachment locations could be implemented along a rear portion of a side-arm, thus allowing different users to attach a modular BCT member at different locations that better fit the respective size and shape of each of their bodies. In some embodiments, modular attachment locations could be provide along both side-arms of a BCT, allowing for connection of two BCT members, and perhaps stereo audio via two BCTs attached thereto.

More generally, it should be understood that other arrangements of attachment locations for a modular BCT member are also possible, both on a glasses-style wearable device and on other types of wearable devices. Further, while FIG. 5 only shows two attachment locations on the same wearable device, wearable devices with more than two attachment locations for a BCT member are also possible.

E. Alternative Arrangements of a Vibration-Transducer Member

It should be understood that many variations on the embodiments illustrated herein, and other embodiments altogether, are possible.

Figure 6:
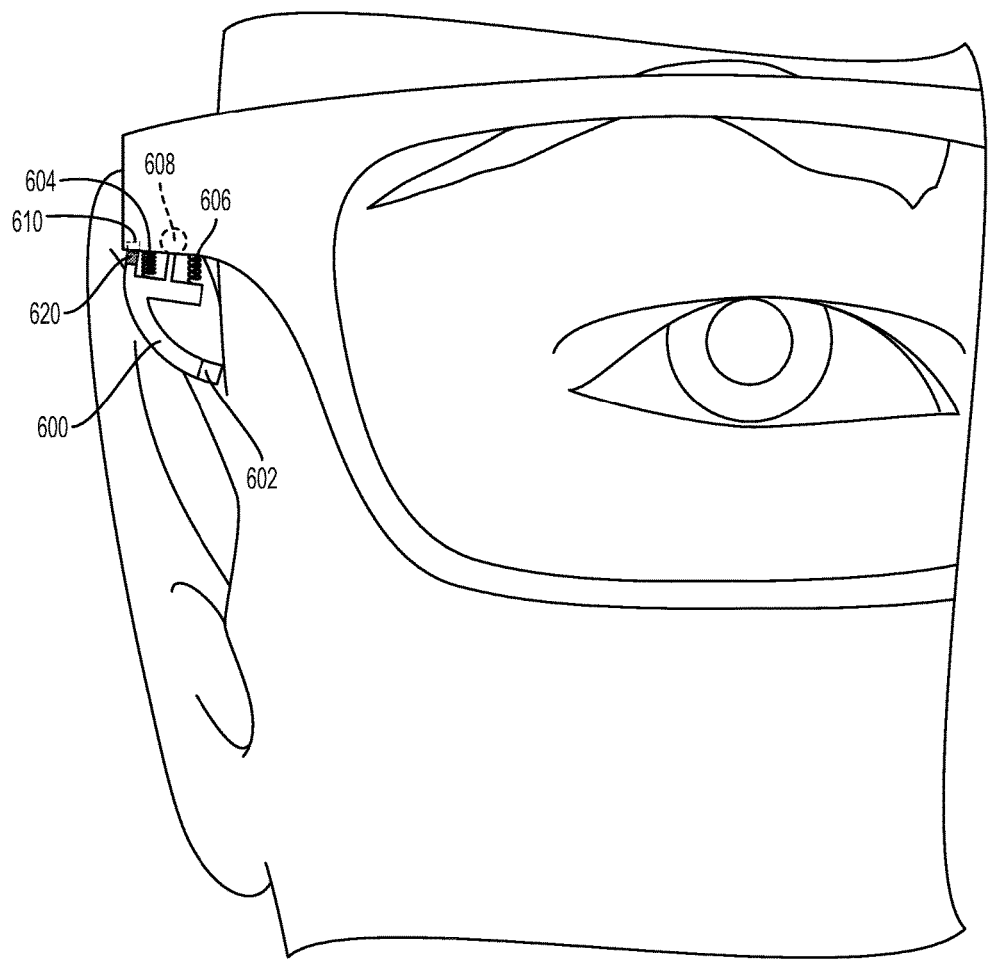
FIG. 6 shows another configuration for a vibration-transducer member on a glasses-style wearable device, according to an example embodiment.

As just one example, FIG. 6 shows another configuration for a vibration-transducer member 600 on a glasses-style wearable device 601, according to an example embodiment. Vibration-transducer member 600 includes a BCT 602, a connector feature 618, springs 614 and 616, and a conductive pad 620.

Further, when coupled to the side-arm of device 601, member 600 is positioned so as to press BCT 602 against the temple of wearer 603. To do so, BCT 602, connector feature 618, springs 614 and 616, and conductive pad 620 may function in the same or a similar manner as BCT 402, connector feature 418, springs 414 and 416, and conductive pad 420, respectively. However, the arrangement of member 600 differs from that of member 400 in that springs 614 and 616 bias the member 600 to press BCT 602 against the wearer's temple, rather than against the back of the wearer's ear.

More specifically, member 600 may attach to the side-arm of device 601 at a location in front of the ear and adjacent to the temple of wearer 603. Additionally, the orientation of member 600 and its components (e.g., BCT 602, connector feature 618, springs 614 and 616, and conductive pad 620) with respect to the side-arm may differ by approximately ninety degrees from the orientation of member 400 with respect to frame component 401. In this arrangement, spring 616 functions as an inner spring that is closer to the temple than spring 614, and spring 614 functions as an outer spring that is closer to the right shoulder of wearer 603 than spring 616. Further, in order to bias member 600 to press BCT 602 against the temple, spring 614 has a greater spring constant than spring 616.

As further shown in FIG. 6, when wearable device 601 is worn and BCT 602 contacts the temple of wearer 603, conductive pad 620 moves into contact with the contact feature 610 for an OHD circuit of device 601. Further, the difference between the spring constants of spring 614 and 616 is such that conductive pad 620 separates from the contact feature 610 when wearer 603 remove devices 601 from their head (thereby returning member 600 to its resting position. While the OHD circuit of device 601 is not shown explicitly in FIG. 6, it should be understood that contact feature 610 may be part of an OHD circuit that operates in a similar manner as the OHD circuit of device 401. As such, the movement of the conductive pad 620 into and out of contact with contact feature 610 may indicate whether the device 601 is donned or doffed, respectively.

F. Other Aspects

Using information from multiple sensors and systems when determining whether a wearable device is being worn provides redundancy and can help to reduce errors in the determined donned and/or doffed status of the device. Accordingly, in some embodiments, a variety of sensors and/or systems may be used to determine whether or not a wearable device is being worn. In such implementations, an indication from an OHD circuit, such as those described in reference to FIGS. 4A to 6, may combined with other sensor information in order to make the ultimate determination as to whether or not a wearable device is being worn.

For example, a proximity sensor may be located on a wearable device such that it is near to a wearer's body when the device is being worn, and will typically be exposed when the device is not being worn. As such, when the proximity sensor indicates an object within some threshold distance from the sensor, this may be interpreted as an indication that the device is being worn. As another example, an inertial measurement unit (IMU) may be utilized to detect positioning and/or movement of a wearable device that is characteristic of the device being worn. And, as yet another example, a capacitive touch sensor may be located on a wearable device such that it contacts a wearer's body when the device is being worn. Other mechanisms for obtaining information indicative of whether a device is being worn are also possible. Further, one or more of such additional indications may be combined with the indication provided by a vibration-transducer member according to an example embodiment.

V. CONCLUSION

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. An apparatus comprising:
a frame component for a wearable device, wherein the frame component comprises a contact feature for a circuit;
a member movably coupled to the frame component, wherein the member is also coupled to a vibration transducer;
at least one conductive pad coupled to the member and aligned with the contact feature in the frame component; and
one or more biasing components extending from the member, wherein the one or more biasing components arranged to cause a resting position of the member in which the conductive pad is separated from the contact feature, thereby opening the circuit, and such that the member is moveable to press the vibration transducer against the wearer, which in turn moves the conductive pad into contact with the contact feature and completes the circuit, when the apparatus is worn.

2. The apparatus of claim 1, wherein the one or biasing components comprise one or more springs.

3. The apparatus of claim 2, wherein the one or more springs comprise a first spring and a second spring extending from the member, wherein the first and the second spring have a first and a second spring constant, and wherein a difference between the first spring constant and the second spring constant results in the resting position of the member in which the conductive pad is separated from the contact feature.

4. The apparatus of claim 1, further comprising a computing system, wherein the computing system is operable to:
determine when the circuit is closed; and
interpret a determination that the circuit is closed as an indication that the wearable device is being worn.

5. The apparatus of claim 1, wherein the circuit comprises an on-head detection (OHD) circuit.

6. The apparatus of claim 1, wherein the one or more biasing components and the connector feature moveably couple the member to the frame component.

7. The apparatus of claim 1, further comprising the vibration transducer arranged on the first end of the member.

8. The apparatus of claim 1, wherein the frame component is a side-arm of a glasses-style support structure.

9. The apparatus of claim 6, wherein glasses-style support structure is part of a head-mountable device (HMD).

10. The apparatus of claim 1, wherein the conductive pad is a carbon pad.

11. The apparatus of claim 1, wherein the frame component is a housing of an earpiece device.

12. The apparatus of claim 9, wherein earpiece device is a display-less device.

13. The apparatus of claim 1, wherein the member is coupled to the frame component at an attachment location that positions the vibration transducer to interface with a posterior surface of the ear when the head-wearable device is worn.

14. An apparatus comprising:
a member coupled to a vibration transducer, wherein the member is configured to further couple to a frame component of a wearable device comprising a contact feature for a circuit;
at least one conductive pad coupled to the member and arranged to align with the contact feature in the frame component; and one or more biasing components extending from the member, wherein the one or more biasing components arranged to cause a resting position of the member in which the conductive pad is separated from the contact feature, thereby opening the circuit, and such that the member is moveable to press the vibration transducer against the wearer, which in turn moves the conductive pad into contact with the contact feature and completes the circuit, when the apparatus is worn.

15. The apparatus of claim 14, wherein the one or biasing components comprise one or more springs.

16. The apparatus of claim 15, wherein the one or more springs comprise a first spring and a second spring extending from the member, wherein the first and the second spring have a first and a second spring constant, and wherein a difference between the first spring constant and the second spring constant results in the resting position of the member in which the conductive pad is separated from the contact feature.

17. The apparatus of claim 14, further comprising a computing system, wherein the computing system is operable to:
 determine when the circuit is closed; and
 interpret a determination that the circuit is closed as an indication that the wearable device is being worn.

18. A wearable device comprising:
 a frame comprising a contact feature for a circuit disposed therein;
 a member movably coupled to the frame component;
 a vibration transducer coupled to the member;
 at least one conductive pad coupled to the member and aligned with the contact feature in the frame component; and
 one or more biasing components extending from the member, wherein the one or more biasing components arranged to cause a resting position of the member in which the conductive pad is separated from the contact feature, thereby opening the circuit, and such that the member is moveable to press the vibration transducer against the wearer, which in turn moves the conductive pad into contact with the contact feature and completes the circuit, when the apparatus is worn.

19. The wearable device of claim 18, wherein the member is removably coupled to the frame component.

20. The wearable device of claim 18, further comprising a control system operable to determine when the circuit is closed, and interpret a determination that the circuit is closed as an indication that the wearable device is being worn.

* * * * *